United States Patent Office 2,739,954
Patented Mar. 27, 1956

2,739,954

PRODUCTION OF ADHESIVES AND ADHESIVE BASES FROM SYNTHETIC RUBBER LATEX BY CAUSING PHASE INVERSION WITH A PROTECTIVE COLLOID AND ADDING ORGANIC SOLVENT

Charles F. Fryling, Pittsburgh, Pa., assignor to Phillips Petroleum Company, a corporation of Delaware No Drawing. Application July 18, 1952,
Serial No. 299,743

8 Claims. (Cl. 260—33.6)

This invention relates to methods of preparing adhesive compositions. In one of its more specific aspects the invention relates to the production of an adhesive base from synthetic rubber latex. In another aspect this invention pertains to the production of adhesive compositions from high solids synthetic rubber latices.

It is known in the art that synthetic rubber can be dissolved in organic solvents to produce adhesive bases which are employed in the preparation of adhesives or adhesive compositions. However, the problem of preparing adhesive bases involves certain difficulties and inconveniences. If the synthetic rubber is prepared by emulsion polymerization, as is most frequently the case, a latex is obtained. When it is desired to prepare a solution of the rubber in an organic solvent, one method is to recover the rubber from the latex by suitable coagulation, separation, and drying steps and then treat it with a solvent. When rubber is obtained from the latex in the form of a dry crumb, it is not readily soluble in most solvents and considerable time is consumed in preparing solutions of the desired concentration, for example, in some instances the rubber is broken up into small particles to aid solution. Attempts have been made to prepare synthetic rubber solutions directly from the latex but in such cases it is generally necessary to use solvent extraction to accomplish solution of the rubber. At best considerable time is consumed in an operation of this type.

I have now discovered a very rapid and convenient method for preparing adhesive bases directly from the latex. By adhesive base I mean a solution of rubber in a rubber solvent which is made into an adhesive by the addition of modifying and other agents, heating, etc. The methods employed in accordance with this invention are particularly suitable to the production of adhesive bases because they are applicable to natural rubber latex, synthetic rubber latices and also to high solids synthetic rubber latex. In accordance with an embodiment of the instant invention an adhesive base is provided by incorporating into liquid rubber latex a protective colloid in an amount sufficient to cause phase inversion and subsequently dissolving rubber polymer dispersed in the resulting inverted emulsion with a water immiscible rubber solvent. Phase inversion means the breaking of the continuity of the aqueous phase in the latex so that what was an oil-in-water emulsion becomes a water-in-oil emulsion.

The protective colloids are substances which behave as hydrophilic colloids when they are dispersed in water. Synthetic rubber latex is an emulsion in which water is present as a continuous phase. It can be diluted with water to give a latex having any solids content desired. Treatment with a protective colloid effects a change in the latex to produce an inverted emulsion in which water is no longer present as a continuous phase. This so-called inverted emulsion cannot be diluted with water to give a smooth latex as before. Instead the solid material remains in the form of lumps or chunks in the water added. However, upon the addition of an organic solvent, the rubber dissolves immediately. If the solution is allowed to stand, any water which was present in the latex will separate as an aqueous phase in which is contained the emulsifying agent and any salts employed in the polymerization recipe, and the protective colloid. The aqueous phase can be removed thus leaving a solution of synthetic rubber in the organic solvent.

A desirable method of preparing adhesive bases in accordance with this invention is to add a protective colloid in the form of a dry powder. For example, a protective colloid in the form of a dry powder is added to the synthetic rubber latex, and the materials intimately mixed by any suitable means. Mixing need be continued only until phase inversion occurs, that is, until the material is homogeneous. The time required is governed by the viscosity of the latex, type of agitation, and the like, but will generally be in the range from 2 to 30 minutes. The solvent is then added and the mixture stirred to effect solution. It is not necessary to heat the mixture as the rubber dissolves readily at room temperature. It is frequently considered advisable to allow the mixture to stand in order that any water present will separate but this step will depend upon the amount of water present and the ultimate use of the synthetic rubber solution. It is very convenient and frequently preferred to use a high solids paste latex such as is described in application Serial No. 253,342 of Wicklatz and Kennedy filed October 26, 1951. Although the rubber base per se can be used for bonding rubber sheet or as an additive in household cements, rubber adhesives themselves require formulation. Their formulation is generally complex but it is well known to the rubber technologist. For example accelerators, anti-oxidants, vulcanizing agents, tackifiers and/or plasticizers will be added. In addition the base may be further modified depending on the specific application desired.

The amount of protective colloid employed must be sufficient to cause phase inversion, conveniently indicated by the addition of water. If phase inversion has not taken place a smooth latex will form upon the addition of water; if phase inversion has taken place a smooth latex will not form, but instead the polymer will separate due to the formation of coagulum. For the most part the minimum amount of protective colloid can be determined from the quantity of soap present in the recipe by which the latex was made. For example, if 5 parts by weight of soap were used in the recipe, which is the quantity frequently used in polymerization systems based on 100 parts by weight of monomeric material, no less than 0.5 part by weight of protective colloid need be used, in other words a minimum amount of protective colloid necessary is 0.1 part per 1 part of soap by weight. The upper limit is determined by practical considerations. When the amount of protective colloid is based upon the soap in the recipe it is normally not necessary, regardless of the quantity of soap employed in a recipe, to use more than 40 parts by weight of the protective colloid per 100 parts by weight of rubber solids. A desirable range is, therefore, 0.1 part to 8 parts by weight of the protective colloid per 1 part of soap. In many instances, such as in the case of natural rubber latex, the amount of protective colloid employed will be more conveniently based upon rubber solids content. In terms of rubber solids content the amount of protective colloid will be in the range of 0.5 to 35 parts by weight of the agent per 100 parts by weight of rubber solids. Hydrophilic protective colloids are, as implied, materials which are solvated by water but not by organic solvents. Examples are albumin, casein, gelatin, glue, Irish moss, water soluble cellulose esters, gum tragacanth, agar, gum guaiac, dextrin, soluble starches and the like.

The solvents employed in the practice of this invention to dissolve the rubber after inversion has occurred are normally water immiscible organic rubber solvents. Solvents which are generally preferred are hydrocarbons, particularly aromatic hydrocarbons such as benzene, toluene, xylene, and the like but aliphatic hydrocarbon solvents such as petroleum ether, kerosene, hexane, cyclohexane, etc. are also applicable. Other solvents which can be used are halogenated aliphatic compounds such as carbon tetrachloride, chloroform, methylene chloride, etc. Nitroparaffins, such as nitromethane and nitroethane, and various ethers can also be used. The amount of solvent will vary depending upon the concentration of the rubber solution desired. Rubber solutions varying in concentration from 0.5 to 50 per cent by weight or higher are desirable, the upper limit being governed by the ability of the solvent to dissolve the rubber.

The novel method of preparing adhesive bases can be more readily understood by reference to the following examples. It is understood, of course, that the examples are illustrative and that the invention is not to be limited thereby.

*Example 1*

A latex paste containing 62 per cent solids was prepared by the copolymerization of butadiene with styrene at 5° C. in accordance with the following recipe:

| | Parts by weight |
|---|---|
| Butadiene | 70 |
| Styrene | 30 |
| Water | 30 |
| Potassium oleate | 5 |
| Mercaptan blend [1] | 0.30 |
| $FeSO_4.7H_2O$ | 0.20 |
| $K_4P_2O_7$ | 0.27 |
| Tert-butylisopropylbenzene hydroperoxide | 0.26 |

[1] A blend of tertiary $C_{12}$, $C_{14}$, and $C_{16}$ aliphatic mercaptans in a ratio of 3 : 1 : 1 parts by weight.

When carrying out the polymerization, potassium oleate was formed in situ by the following procedure. Water, oleic acid, styrene, mercaptan blend, and butadiene were charged to the reactor and agitated until the fatty acid and mercaptan were dissolved in the monomer phase. (A sufficient amount of water was withheld for preparation of the KOH and activator solutions.) Potassium hydroxide was then introduced in an amount required to give 95 per cent neutralization of the oleic acid (pH of the system was approximately 10.3). The mixture was agitated for about 30 minutes during which time the temperature was adjusted to 5° C. The hydroperoxide, dissolved in about 20 per cent of the styrene which was withheld for this purpose, was introduced and then the ferrous pyrophosphate activator solution. The activator solution was previously prepared by dissolving the ingredients separately in water, pouring the ferrous sulfate into the pyrophosphate, and heating the mixture at 60° C. for 40 minutes. A latex paste containing 62 per cent solids (79 per cent conversion) was obtained after a reaction period of 48 hours. The run was not shortstopped and the unreacted monomers were not removed. The solids content was determined by withdrawing a sample using the syringe technique. The sample was weighed (syringe containing sample weighed, sample discharged, and syringe weighed again), dried on a hot plate, and the residue weighed. From a 1.2 gram sample, 0.74 gram solids was obtained. Calculation showed the latex to have a solids content of 62 per cent. The per cent conversion was determined in the following manner:

| | Grams |
|---|---|
| Recipe weight | 136 |
| Solids (soap, etc.) in recipe | 6 |

$$\frac{(136)(0.74)}{1.2}(100) = 84.3$$

$$84.3 - 6 = 78.3\% \text{ conversion}$$

A sample of the latex paste prepared as described above was mixed with 20 per cent of its weight of powdered albumin until a homogeneous material was obtained. Based on a 62 per cent solids latex, this represents 32 parts albumin per 100 parts rubber solids. Approximately five minutes was required. Toluene, approximately four volumes per volume of latex, was added and the rubber dissolved immediately. After allowing the mixture to stand, an aqueous layer separated and was removed leaving a clear solution of rubber in toluene.

*Example 2*

One sample of the latex paste prepared in Example 1 was diluted with water. A smooth latex formed immediately thus demonstrating that the latex could be diluted with water to any solids content desired. To another sample of the latex toluene was added and the mixture agitated. After 15 minutes there was no apparent evidence of solution of the rubber in the organic solvent. A third sample of the latex was masticated with albumin and this mixture divided into two parts. Water was added to one part. A smooth latex did not form as was the case with the sample containing no albumin. Toluene was added to the second portion and the rubber dissolved readily to form a clear solution. These results indicate that phase inversion had taken place upon treatment of the latex with albumin.

The above examples clearly illustrate a desirable method of preparing adhesive bases. The adhesive bases so prepared must, of course then be treated by any of the available methods to produce adhesives having desired properties. However these methods are well known to those skilled in the art, e. g., the base can be modified by heat treatment, by the addition of modifying agents and other substances to improve tack such as mercaptobenzothiazole, or vegetable or mineral oils or resins such as phenol or resorcinol resins to produce a desired adhesive. Obviously many modifications or variations of the invention as hereinbefore set forth may be made without departing from the spirit and the scope thereof. Thus besides rubber copolymers of butadiene and styrene the invention is applicable to elastic polymers of butadiene, and elastic copolymers of butadiene, isoprene and other simple dienes with each other and with vinyl compounds of many types, for example polymers and copolymers of piperylene and copolymers of butadiene with chlorostyrenes or acrylonitrile.

I claim:

1. A process for the production of an adhesive base which comprises incorporating into a high solids content rubber latex a sufficient amount of protective colloid to cause phase inversion of the latex, conveniently indicated by separation of the polymer as coagulum upon addition of water to the latex; subsequently adding to the inverted emulsion a sufficient amount of a water-immiscible rubber solvent to dissolve the rubber content thereof, and by phase separation recovering the rubber-in-solvent solution from the water originally present in the latex.

2. A process for the production of an adhesive base which comprises mixing a high solids content synthetic rubber latex, prepared from a recipe using soap, with a protective colloid so as to cause phase inversion of the latex, conveniently indicated by separation of the polymer as coagulum upon addition of water to the latex, at least 0.1 part by weight of the protective colloid being added per 1 part by weight of soap used in the latex recipe; dissolving the rubber polymer content of the resulting inverted emulsion with a water insoluble rubber solvent, and by phase separation recovering the solution of rubber from the water initially present in the latex.

3. Process of claim 2 wherein 0.1 to 8 parts by weight of the protective colloid are added to 1 part by weight of the soap used in the latex recipe.

4. A process for the production of an adhesive base which comprises incorporating into a high solids content natural rubber latex a sufficient amount of a protective colloid to cause phase inversion, conveniently indicated by separation of the polymers as coagulum upon addition of water to the latex, the amount of protective colloid added being in the range of 0.5 to 35 parts by weight per 100 parts by weight of rubber solids; dissolving the latter by mixing the resulting inverted emulsion with a water-insoluble rubber solvent, and by phase separation recovering the rubber solvent containing dissolved rubber from the water originally present as a continuous phase in the latex.

5. A process which comprises incorporating into a high solids content liquid rubber latex a protective colloid in an amount sufficient to cause phase inversion, conveniently indicated by separation of the rubber as coagulum upon addition of water to the latex; subsequently dissolving the rubber content by mixing the resulting inverted emulsion with a water-immiscible rubber solvent; by phase separation recovering the solvent containing dissolved rubber from the water initially present in the latex as a continuous phase, adding sufficient mercaptobenzothiazole to the separated solvent to improve the tack thereof, and diluting the resultant product as desired to produce an adhesive composition.

6. A process for the production of an adhesive base which comprises; into a synthetic rubber latex, prepared from a recipe using soap, and containing from 60 per cent to 90 per cent solids incorporating powdered albumin in a ratio of 0.1 to 8 parts by weight of powdered albumin to 1 part by weight of soap used in the latex recipe, sufficient to cause phase inversion, subsequently dissolving said rubber by mixing the resulting inverted emulsion with toluene and recovering the toluene containing dissolved rubber polymer from water initially present in the latex as a continuous phase.

7. A process for the production of an adhesive base which comprises intimately mixing 32 parts of powdered albumin by weight based on 100 parts of dry rubber solids and a synthetic rubber latex containing 62 per cent solids formed by the emulsion polymerization of a major amount of butadiene with a minor amount of styrene in an iron pyrophosphate system with potassium oleate as the emulsifier, after phase inversion occurs adding 4 volumes of toluene per volume of latex to dissolve the rubber solids and by phase separation recovering the toluene containing dissolved rubber polymer from water initially present in the latex as a continuous phase.

8. A process for the production of an adhesive base which comprises intimately mixing 32 parts of powdered albumin by weight based on 100 parts of dry rubber solids and a synthetic rubber latex containing 62 per cent solids formed by the emulsion polymerization of 70 parts by weight of butadiene with 30 parts by weight of styrene at 5° C. in an iron pyrophosphate system with potassium oleate as the emulsifier, after phase inversion occurs adding 4 volumes of toluene per volume of latex to dissolve the rubber solids and by phase separation recovering the toluene containing dissolved rubber polymer from water initially present in the latex as a continuous phase.

References Cited in the file of this patent

UNITED STATES PATENTS

| | | |
|---|---|---|
| 2,419,060 | Edwards | Apr. 15, 1947 |
| 2,495,135 | Rodman | Jan. 17, 1950 |

FOREIGN PATENTS

| | | |
|---|---|---|
| 205,487 | Great Britain | Oct. 30, 1924 |